United States Patent

Pretto

[11] 4,302,834
[45] Nov. 24, 1981

[54] PHONOGRAPH PICKUP ARM

[76] Inventor: John Pretto, 624 S. Belmont, Arlington Heights, Ill. 60005

[21] Appl. No.: 106,685

[22] Filed: Dec. 26, 1979

[51] Int. Cl.³ .............................................. G11B 3/38
[52] U.S. Cl. .................................... 369/250; 369/255
[58] Field of Search .......................... 274/23 A, 23 R; 369/250, 255

[56] References Cited

U.S. PATENT DOCUMENTS 1,391,797  9/1921  Scrabic ............................ 274/23 A
1,963,673  6/1934  Patino ............................... 274/23 A
3,059,934  10/1962  Urmenyi ........................... 274/23 A Primary Examiner—John W. Shepperd
Attorney, Agent, or Firm—Robert J. Black

[57] ABSTRACT

A phonograph pickup arm for use in disc records arranged to compensate for error in the tracking path. By use of adjacent curved surfaces in mounting and support members the point of rotational access of the pickup arm shifts as the stylus associated with the pickup arm moves left to right or vice versa to compensate for the usually present tracking error.

7 Claims, 4 Drawing Figures

PHONOGRAPH PICKUP ARM

BACKGROUND OF THE INVENTION (1) Field of the Invention

The present invention relates to a phonograph pickup arm for use with disc records and more particularly to an improved pickup arm arranged and constructed so as to maintain the stylus in contact with the recorded surface and compensate for error in the tracking path.

(2) Description of the Prior Art

In the recording of phonograph records, the recording is performed in such a manner that the recording cutter head usually moves linearly across the disc to be recorded. At the same time it is common practice in modern phonograph record players to mount the pickup on an arm that is pivoted at some point beyond the rim of the phonograph turntable. These arms while providing very little friction suffer from the unfortunate effect, in their simplest forms to be unable to eliminate the resulting tracking error between the pickup and record groove. This discrepancy gives rise to tracking distortion as well as providing undesirable pressure on the sides of the stylus included in the phonograph pickup. The simplest approach to solving this particular problem is the utilization of an offset arm which reduces the noted tracking errors but does not eliminate them and increases side pressure on the stylus. Obviously it is impossible to reproduce the sounds on the record disc with the degree of fidelity desired because of said so called tracking errors. To compensate for the tracking error it is required to maintain the cartridge carrying the stylus in a direction tangential to the sound groove of the recorded disc throughout the record playing.

Several differenct techniques have been suggested to eliminate the tracking error. One conventional method for that purpose involves attaching the base end of the pickup arm to spiral advancing means which are arranged over or outside of the turntable arm, to laterally move the base end of the pickup arm; and to thus carry the stylus in the direction of the diameter of the recorded disc. Thus the track of the stylus is positioned through the center of the record and obviously eliminates any tracking errors, since the reproduced tracking path essentially follows the initial recording path. In addition to extreme complexity and cost such arrangements suffer from other problems such as stiffness of the included electrical leads and friction. One pickup arm of this type which overcomes some of the problems but essentially is still a complex and expensive form of pickup arm is disclosed in U.S. Pat. No. 2,915,315 which issued on Dec. 1, 1959 to Jacob Rabinow.

Another conventional method for the prevention or elimination of tracking error is disclosed in U.S. Pat. No. 3,476,394, which teaches the mounting of a transducer on a transducer arm which in turn is carried on a slave arm mounted for rotational movement parallel with the plane of the disc with the transducer arm being allowed to move in relation to the slave arm about an axis normal to the plane of the disc. Drive means are included which move the pickup arm in or out upon the slave arm as the slave arm rotates about its normal axis thus changing the effective length of the transducer arm whereby as the pickup stylus moves across the face of the disc it lies in a plane approximating that of the original recording stylus. This system too, is a complex and expensive system requiring a separate drive means to effectively change the length of the transducer arm combination to effect the improved operation.

A similar pickup arm assembly for eliminating tracking error is disclosed in U.S. Pat. No. 3,924,860. In the disclosed arrangement, detecting means are included for detecting whether a fixed point lies on the fulcrum of the line connecting the pickup arm and the stylus and control means, for controlling a rotary member supporting the pickup arm to operate in cooperation with the detecting means to compensate for the normally present tracking error.

All of the techniques for eliminating tracking errors represented by the above noted patents suffer from the drawback of the extreme complexity and resultant expense. Accordingly it is the object of the present invention to provide a novel phonograph pickup arm which elements the above mentioned disadvantages.

SUMMARY OF THE INVENTION

The foregoing objective is achieved by providing a unique tone arm mounting arrangement wherein tracking error is reduced to a minimum by a compensating structure which provides the necessary compensation to overcome tracking error without resorting to separate or external drive means or introduction of complicated error detecting techniques and compensation control means.

The mounting arrangement for a tone arm taught in the present application includes a vertical tone arm mounting located adjacent to the circumference of an associated turntable and extending perpendicular to the plane of the associated phonograph turntable and having at least one of its vertical surfaces curved so the arcuate or curved surface extends along the rear portion of the mounting. The tone arm itself which may be round, square or rectangular in cross section, includes a vertical support section extending from the tone arm. It also includes an arcuate surface. The arcuate surfaces of the tone arm vertical support and the vertical mounting are positioned adjacent to each other with the tone arm vertical support maintained in proximal contact to the vertical mounting by means of a flexible band or cable of extremely thin conformation which permits the vertical tone arm section to rotate across the face of the arcuate surface portion of the vertical mounting while at the same time being maintained in contact with the vertical mounting. This band or similar means which are used to retain the vertical support to the vertical mounting is fastened to a portion of the vertical mounting and passes across the arcuate surface or face of the vertical mounting preceding across the distant portion of the arcuate surface of the vertical support and returning from the distant side of the vertical support to the distant side of the vertical mounting. In this manner the vertical support attached to the tone arm can travel across the arcuate surface of the vertical mounting and while acting as the vertical axis for the tone arm, the point of axis shifts as the head of the pickup arm moves left to right or vis-versa to compensate for the usual tracking error.

The tone arm may pass directly through and be affixed to the vertical support and also through the vertical mounting however the vertical mounting contains a large enough opening to allow the tone arm to move through any desired radius during its normal operation and also to facilitate the horizontal movement of the arm about its moving axis described above.

However in at least one form of the invention a similar arrangement is also used to mount the tone arm in the vertical direction and provide flexible movement about a shifting radius. To accomplish this the vertical tone arm support includes in the center thereof an arcuate or curved surface facing the rear of the tone arm and having a horizontal tone arm support affixed directly to the tone arm and also having an arcuate or curved surface placed in contact with the vertical tone arm support, held in place by flexible band means similar to those described above. By this means the arm may also move in the vertical direction and maintain a relatively constant angle between the stylus and spiral trace on the face of the phonograph record.

In addition the tone arm is equipped with a counter balance or counter spring arrangement at one end of the tone arm, and at the other end a mounting means to receive a stylus containing cartridge or similar transducer.

The vertical mounting assembly of the pickup arm may be affixed to the phonograph base in any well known manner and may include means to compensate for horizontal forces acting against the transducer stylus sometimes referred to as an anti-skate device.

DESCRIPTION OF THE PREFERRED EMBODIMENT

Figure 1:
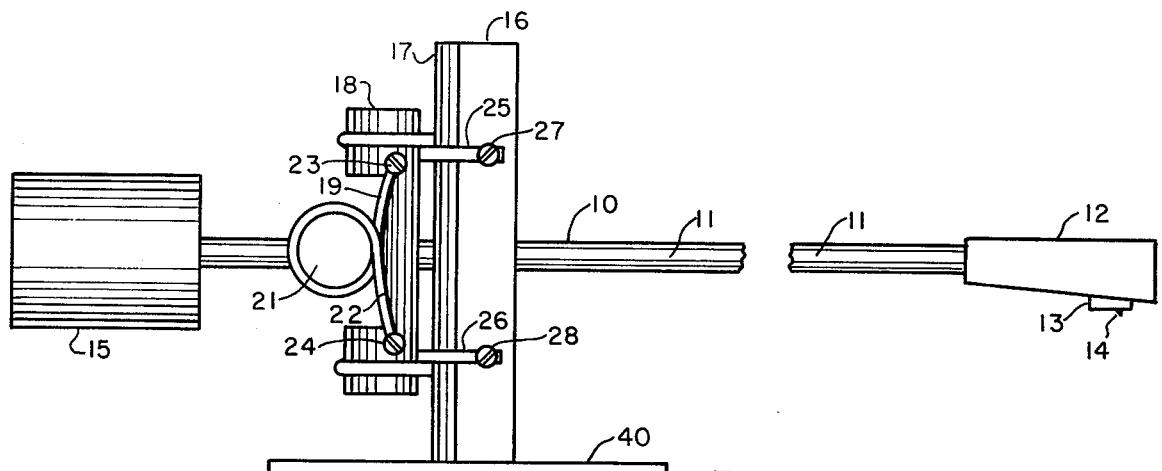
FIG. 1 comprises a side view of a pickup arm assembly and associated mounting in accordance with the present invention.
Figure 2:
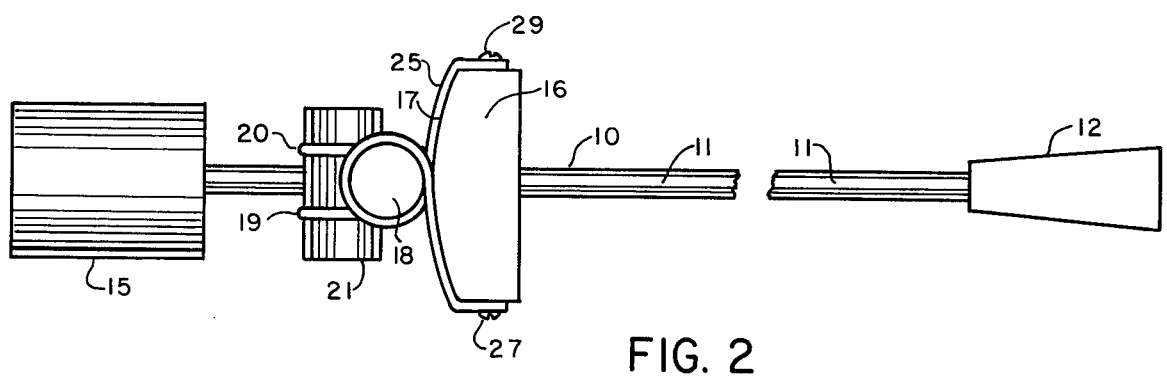
FIG. 2 is a top view of a pickup arm and associated mounting in accordance with the present invention.

Referring now to the drawings a pickup arm and associated mounting in accordance with the present invention is shown. The arm includes a center or beam section 11 with a cartridge or transducer mounting portion 12 located on one end thereof and including at that same end a transducer or phono cartridge 13 including a stylus or needle 14. Located on the other end of the arm is a counter weight 15 or counter spring mechanism adapted to compensate for the extended length of arm 11 and weight of transducer 13. Neither the counter weight or counter spring or the transducer mounting, etc. form a portion of the present invention but rather are shown for purpose of explanation only.

Figure 3:
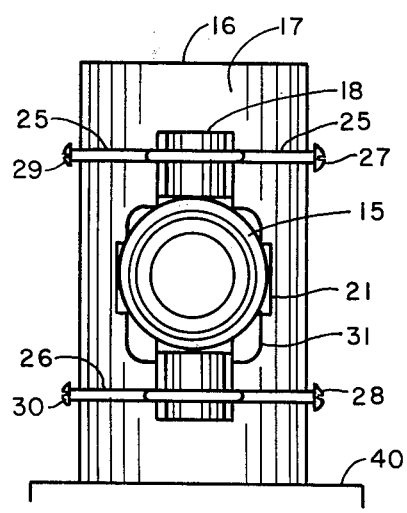
FIG. 3 is a rear view of a pickup arm and associated mounting in accordance with the present invention.
Figure 4:
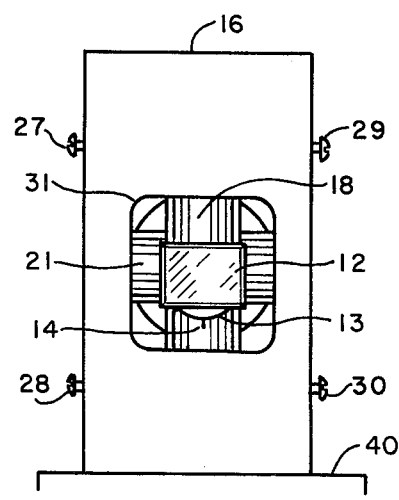
FIG. 4 is a front view of a pickup arm and associated mounting in accordance with the present invention.

The aforementioned arm assembly is associated with a vertical mounting 16 which on its rearward facing surface 17 is arcuate or curved in configuration. In alternate forms the surface may be a complex contoured curve adapted to provide maximum tracking compensation of the tone arm in turntables of complex geometry vertical mounting 16 is affixed in any well known manner to a portion of turntable support struction 40 in a location external to the turntables circumference and perpendicular to the plane of the turntable. As may be seen by reference to FIGS. 3 or 4 the vertical mounting portion 16 includes an opening 31 through which the arm assembly passes and which is large enough to accommodate a substantial movement of the tone arm 10. Adjacent to the vertical mounting 16 and particularly to the cambered surface 17 is vertical arm support structure 18 which in the present embodiment as shown as essentially cylindrical in form. The vertical support 18 is at its circumference essentially in contact with the curved surface 17 of vertical mounting unit 16 and is maintained in such location by straps 25 and 26 which are affixed to vertical mounting means 16 by fasteners 27 and 28 respectively extending around the circumference of vertical support means 18 and then fastened by fasteners 29 and 30 to vertical mounting structure 16.

As may be readily envisioned the outside circumference portion of cylinder 18 that is essentially in contacted with curved surface 17 of vertical mounting structure 16 is able to rotate across the surface 17 and yet remains in substantially rigid contact therewith. The vertical mounting 16 and/or the vertical support 18 may have magnetic characteristics to provide dampening of motion during operation.

The band or support means as illustrated in the drawings of the present invention with thickness for purpose of illustration only, since in a particular application this band may be less than 0.004 inches thick and of a flexible material that may include a self lubricating characteristic combined with the necessary strength to support and retain the weight of the tone arm and still stay in proximal contact with vertical mounting 16. The support means may also be of magnetic material to facilitate dampening.

As may be seen in the figures of the included drawing the bands 25 and 26 are held by means of screws 27, 28, 29 and 30 to the vertical mounting structure 16. However it should be noted that the particular means of fastening the bands 25 and 26 to the vertical mounting unit 16 does not form a portion of the present invention and any well known technique may be employed.

In one embodiment of the present invention the beam portion 11 of pickup arm 10 is fastened rigidly through the center of the vertical support element 18 and exhibits no latitude of vertical motion. However in the embodiment illustrated in the drawings, a similar arrangement is employed to effect vertical motion as for horizontal motion. That is the beam portion 11 is rigidly affixed through the center of a horizontal support means 21 which may be cylindrical in form having its exterior surface in proximal contact with a curved or arcuate surface 22 included as a portion of vertical support means 18. When this arrangement is used vertical support means 18 includes at the center thereof an opening (not shown) large enough to permit vertical motion of beam 11 of tone arm 10. The horizontal support means is held in proximal contact with curved surface 22 of vertical support 18 by support bands 19 and 20 which are retained by fasteners 23 and 24 and 23' and 24' (not shown) respectively.

As viewed in FIG. 1 the center of cylinder 21 forms the axis for vertical motion of the tone arm. This arrangement results in increased compliance and constant positioning of the stylus 14 in the vertical position to further reduce distortion. A similar arrangement could alternately be placed adjacent to the transducer mounting 12.

While only a single embodiment of the present invention has been disclosed, it will be obvious to those skilled in the art that numerous modifications can be made without departing from the spirit and scope of the present invention, which should be limited only by the claims appended hereto.

What is claimed is:

1. A pickup arm assembly for a transducer including stylus means for engaging a spiral trace and detecting prerecorded signals on an associated rotating disc comprising:
- a transducer arm positioned for rotational movement parallel to the plane of said rotating disc, including a transducer mounted on one end thereof;
- a vertical mounting member mounted adjacent to and perpendicular to the plane of said rotating disc including a curved surface and a cavity centrally located through said vertical mounting member arranged to accept within said cavity said transducer arm;
- a vertical support member supporting said transducer arm, including a curved surface mounted against and in communication with said curved surface of said vertical mounting member;
- mounting means attached to said vertical mounting member, adapted to retain said vertical support member against and in communication with said curved surface of said vertical mounting member;
- said vertical support member arranged to traverse across said curved surface of said vertical mounting member responsive to mechanical force transmitted by said transducer arm as said transducer and stylus means traverse a path in communication with said spiral trace on said rotating disc.

2. A pickup arm assembly as claimed in claim 1, wherein: said vertical mounting member further includes a first and second surface; said mounting means connected at a first end to said first surface, encircling said vertical support member and connected to said vertical mounting member second surface at a second end.

3. A pickup arm assembly as claimed in claim 2, wherein: said mounting means comprise a plurality of flexible bands.

4. A pickup arm assembly as claimed in claim 2, wherein: said mounting means comprise a plurality of flexible bands of magnetic material.

5. A pickup arm assembly as claimed in claim 1, wherein: said vertical mounting member is constructed of magnetic material.

6. A pickup arm assembly as claimed in claim 1, wherein: said vertical support member is constructed of magnetic material.

7. A pickup arm assembly as claimed in claim 1, wherein; said vertical support member further includes a second curved surface in a plane perpendicular to said first curved surface; a horizontal support member including a curved surface mounted against and in communication with said second curved surface of said vertical support member; said horizontal support member further including a cavity centrally located through said support member adapted to accept within said cavity said transducer arm; mounting means connected to said vertical support member and adapted to retain said horizontal support member against and in communication with said second curved surface of said vertical support member; said horizontal support member arranged to traverse across said curved surface of said vertical support member responsive to mechanical force transmitted by said transducer arm and said transducer and stylus means traverse a path in connection with said spiral trace on said rotating disc, said traverse of said horizontal support member being such that during the traverse of the stylus means said transducer arm remains positioned substantially parallel to the plane of said rotating disc.

* * * * *